(12) United States Patent
Julian et al.

(10) Patent No.: US 7,962,141 B2
(45) Date of Patent: Jun. 14, 2011

(54) METHODS AND APPARATUS FOR FLEXIBLE FORWARD-LINK AND REVERSE-LINK HANDOFFS (75) Inventors: David Jonathan Julian, San Diego, CA (US); Avneesh Agrawal, San Diego, CA (US); Arak Sutivong, Bangkok (TH); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/856,648

(22) Filed: Sep. 17, 2007

(65) Prior Publication Data
US 2008/0009292 A1    Jan. 10, 2008

Related U.S. Application Data (63) Continuation of application No. 11/020,716, filed on Dec. 22, 2004, now Pat. No. 7,292,856.

(51) Int. Cl.
*H04W 36/00* (2009.01)
*H04W 4/00* (2009.01)

(52) U.S. Cl. .......................................... 455/437; 370/332

(58) Field of Classification Search .................. 455/436, 455/437, 439, 127.1, 127.5, 438, 441, 442, 455/443, 444, 445, 450, 452.2, 509, 464, 455/67.11, 411, 453, 67.13; 370/331, 332, 370/469, 237, 343, 453, 392, 252, 310, 520, 370/401, 450, 452.2, 241, 408, 328, 235, 370/230.1, 260, 389, 254, 340, 336, 242, 370/232

See application file for complete search history.

(56) References Cited

U.S. PATENT DOCUMENTS

| 5,390,366 | A | 2/1995 | Kasugai |
| 6,134,200 | A | 10/2000 | Timmermans |
| 6,628,631 | B1 | 9/2003 | Mazawa et al. |
| 6,633,554 | B1 | 10/2003 | Dalal |
| 6,636,735 | B2 | 10/2003 | Mohebbi |
| 6,725,043 | B2 | 4/2004 | Bonta et al. |

(Continued)

FOREIGN PATENT DOCUMENTS

CN    1272756    11/2000

(Continued)

OTHER PUBLICATIONS

International Search Report—PCT/US2005/046738, International Search Authority—European Patent Office—Apr. 18, 2006.

(Continued)

*Primary Examiner* — Melody Mehrpour
(74) *Attorney, Agent, or Firm* — Florin Corie (57) ABSTRACT

The disclosed embodiments provide for methods and systems for selecting sectors for handoff in a communication system. According to one aspect, the method includes monitoring an indicia of transmit power on a plurality of RL control channels directed to a plurality of sectors, and selecting one of the sectors as a candidate for a RL handoff. The disclosed embodiments also provide for methods and systems for indicating a selected serving sector for handoff in a communication system. According to one aspect, the method includes sending a first signal to a first sector to indicate the first sector as a serving sector for a forward-link handoff, and sending a second signal to a second sector to indicate the second sector as a serving sector for a reverse-link handoff.

23 Claims, 8 Drawing Sheets

U.S. PATENT DOCUMENTS

| | | | |
|---|---|---|---|
| 6,757,270 B1 | 6/2004 | Kumar et al. | |
| 6,859,444 B1 | 2/2005 | Vancraeynest | |
| 6,973,308 B1 * | 12/2005 | Smith | 455/436 |
| 6,993,341 B2 * | 1/2006 | Hunzinger | 455/450 |
| 7,054,632 B2 * | 5/2006 | Attar et al. | 455/436 |
| 7,133,688 B2 | 11/2006 | Das et al. | |
| 7,190,964 B2 | 3/2007 | Damnjanovic et al. | |
| 7,684,778 B1 * | 3/2010 | Qian et al. | 455/302 |
| 2002/0085517 A1 | 7/2002 | Lee et al. | |
| 2002/0094834 A1 | 7/2002 | Baker et al. | |
| 2002/0138721 A1 | 9/2002 | Kwon et al. | |
| 2002/0196752 A1 | 12/2002 | Attar et al. | |
| 2003/0017831 A1 * | 1/2003 | Lee et al. | 455/453 |
| 2003/0064741 A1 * | 4/2003 | Silva et al. | 455/522 |
| 2003/0073455 A1 | 4/2003 | Hashem et al. | |
| 2003/0076796 A1 | 4/2003 | Kondo | |
| 2003/0086393 A1 | 5/2003 | Vasudevan et al. | |
| 2003/0119511 A1 | 6/2003 | Shin | |
| 2004/0037291 A1 | 2/2004 | Attar et al. | |
| 2004/0114552 A1 | 6/2004 | Lim et al. | |
| 2004/0158790 A1 | 8/2004 | Gaal et al. | |
| 2004/0235425 A1 | 11/2004 | Tayloe et al. | |
| 2005/0073975 A1 | 4/2005 | Chen et al. | |
| 2006/0135173 A1 * | 6/2006 | Vannithamby | 455/453 |
| 2006/0187883 A1 | 8/2006 | Abrol et al. | |
| 2007/0155388 A1 | 7/2007 | Petrovic et al. | |
| 2007/0173256 A1 | 7/2007 | Laroia et al. | |
| 2007/0201407 A1 | 8/2007 | Borran et al. | |
| 2010/0111152 A1 * | 5/2010 | Bhushan et al. | 375/224 |

FOREIGN PATENT DOCUMENTS

| | | |
|---|---|---|
| EP | 0902551 A2 | 3/1999 |
| EP | 1049349 A1 | 11/2000 |
| EP | 1059736 A2 | 12/2000 |
| EP | 1432261 A1 | 6/2004 |
| EP | 1507422 A1 | 2/2005 |
| JP | 9312869 | 12/1997 |
| JP | 2000350248 | 12/2000 |
| JP | 200136942 | 2/2001 |
| JP | 2001145147 | 5/2001 |
| JP | 2002305767 | 10/2002 |
| JP | 2004515932 | 5/2004 |
| JP | 2004519122 | 6/2004 |
| JP | 2004531124 | 10/2004 |
| JP | 2005006116 | 1/2005 |
| JP | 2005508588 | 3/2005 |
| JP | 2005517343 | 6/2005 |
| JP | 2006517761 | 7/2006 |
| JP | 2007502559 | 2/2007 |
| KR | 1020050084908 | 8/2005 |
| RU | 2143177 C1 | 12/1999 |
| RU | 2073913 | 3/2009 |
| WO | WO9205556 | 4/1992 |
| WO | WO9747154 A1 | 12/1997 |
| WO | WO99044313 | 9/1999 |
| WO | 0133871 | 5/2001 |
| WO | WO01089162 | 11/2001 |
| WO | WO02078371 | 10/2002 |
| WO | 0300378 | 1/2003 |
| WO | WO03044970 A2 | 5/2003 |
| WO | WO03067783 | 8/2003 |
| WO | 03090488 | 10/2003 |
| WO | WO 2004/064294 | 7/2004 |
| WO | WO2004060011 | 7/2004 |
| WO | WO2004064304 | 7/2004 |
| WO | 2004100569 | 11/2004 |
| WO | WO2005018114 A1 | 2/2005 |
| WO | WO2005018256 | 2/2005 |
| WO | WO2005041515 | 5/2005 |
| WO | WO 2005/125253 | 12/2005 |

OTHER PUBLICATIONS

International Preliminary Examination Report—PCT/US2005/046738, International Search Authority—The International Bureau of WIPO—Jun. 26, 2007.

Written Opinion—PCT/US2005/046738, International Search Authority—European Patent Office—Jun. 22, 2007.

Beek et al., 'A Time and Frequency Synchronization Scheme for Multiuser OFDM', Nov. 1999, IEEE Journal on Selected Areas in Communication, vol. 17, No. 11, pp. 1900-1914.

Bottomley et al., 'A Generalized Rake Receiver for Interference Suppression', Aug. 2000, IEEE Journal on Selected Areas in Communication vol. 18, No. 18, pp. 1536-1544.

Ebeling et al., 'Implementing an OFDM Receiver on the RaPiD Reconfigurable Architecture', Nov. 2004, IEEE Transactions on Computer, vol. 53, No. 11, pp. 1436-1447.

Group-orthogonal multicarrier CDMA Xiaodong cai; Shengli zhou; giannakis, G.B.; Communication, IEEE Transaction on vol. 52, Issue 1, Jan. 2004 pp. 90-99.

Hwang, "A tendency of 2.3 GHz wireless super-high speed internet technology," Data presented by Hanaro Telecom, Inc., Mar. 25, 2003.

Nasipuri et al., "A MAC Protocol for Mobile Ad Hoc Network Using Directional Antennas", Sep. 2000, IEEE Wireless Communications and Networking Conference, 2000, vol. 3, pp. 1214-1219.

Parsaee et al., 'OFDMA for the 4th Generation Cellular Networks', IEEE Canadian Conference on Electrical and Computer Engineering, 2004, May 2004, pp. 2325-2330.

* cited by examiner

METHODS AND APPARATUS FOR FLEXIBLE FORWARD-LINK AND REVERSE-LINK HANDOFFS

CLAIM OF PRIORITY UNDER 35 U.S.C. §120

The present Application for Patent is a Continuation of patent application Ser. No. 11/020,716 entitled "METHODS AND APPARATUS FOR FLEXIBLE FORWARD-LINK AND REVERSE-LINK HANDOFFS" filed Dec. 22, 2004, issued on Nov. 6, 2007 as U.S. Pat. No. 7,292,856, and assigned to the assignee hereof and hereby expressly incorporated by reference herein.

BACKGROUND

I. Field

The present invention relates generally to communications, and more specifically to techniques for handoffs in a communication system.

II. Background

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

A communication system may employ a handoff scheme to allow a moving access terminal to stay in communication with serving access points or sectors. There is therefore a need in the art for techniques to efficiently select reverse-link (RL) and/or forward-link (FL) serving sectors and indicate such choices for RL and/or FL handoffs in a communication system.

SUMMARY

Techniques for efficiently selecting reverse-link (RL) and/or forward-link (FL) serving sectors and indicating such choices for RL and /or FL handoffs in a communications system are disclosed. The disclosed embodiments provide for methods and systems for selecting serving sectors for handoff in a communication system. According to one aspect, the method includes monitoring an indicia of transmit power on a plurality of RL control channels directed to a plurality of sectors, and selecting one of the sectors as a candidate for a handoff. The disclosed embodiments also provide for methods and systems for indicating selected serving sectors for handoff in a communication system. According to one aspect, the method includes sending a first signal to a first sector to designate the first sector as a serving sector for a forward-link handoff, and sending a second signal to a second sector to designate the second sector as a serving sector for a reverse-link handoff.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein is "exemplary" and is not necessarily to be construed as preferred or advantageous over other embodiments or designs.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber unit, mobile station, mobile, remote station, remote terminal, user terminal, user agent, or user equipment. An access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals. The access point acts as a router between the access terminal and the rest of the access network, which may include an IP network, by converting received air-interface frames to IP packets. Access point also coordinates the management of attributes for the air interface.

Figure 1:
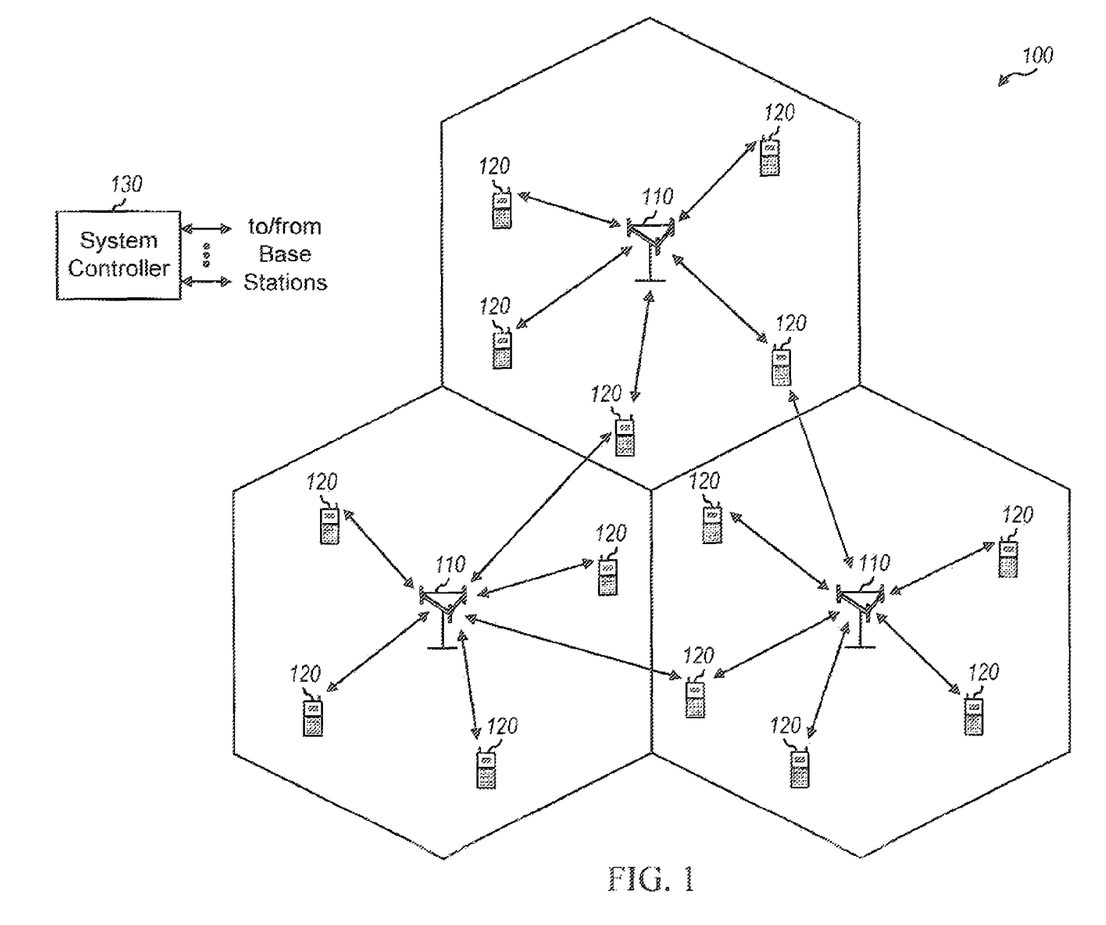
FIG. 1 shows a wireless communication system.

FIG. 1 shows a wireless communication system 100 with a number of access points 110 that support communication for a number of wireless access terminals 120. An access point is a fixed station used for communicating with the terminals and may also be called an access point, a base transceiver station (BTS), a Node B, or some other terminology. An access terminal may be fixed or mobile and may also be called AT, a mobile station (MS), a mobile equipment (ME), a user equipment (UE), a wireless device, a subscriber unit, or some other terminology. The terminals may be dispersed throughout the system. Each AT may communicate with any number of terminals at any given moment depending on various factors such as, for example, the numbers of terminals within the coverage area of the AT, the available system resources, the data requirements of the terminals, and so on. A system controller 130 may provide coordination and control for the access points.

During handoff, an AT has an active set of sectors which includes the current FL and RL serving sector and the set of potential sectors that the AT can handoff to. The AT has a number of dedicated RL control channels assigned to each sector in the active set. Several embodiments are disclosed in the following sections for using the closed-loop power control on such control channels to characterize the RL quality for each sector in the active set. The disclosed embodiments provide for characterizing the relative performance of several reverse-links (RL) and/or forward links (FL), select RL and/or FL serving sectors, and indicate such selections for RL and/or FL handoffs.

RL Serving-Sector Selection

Figure 2:
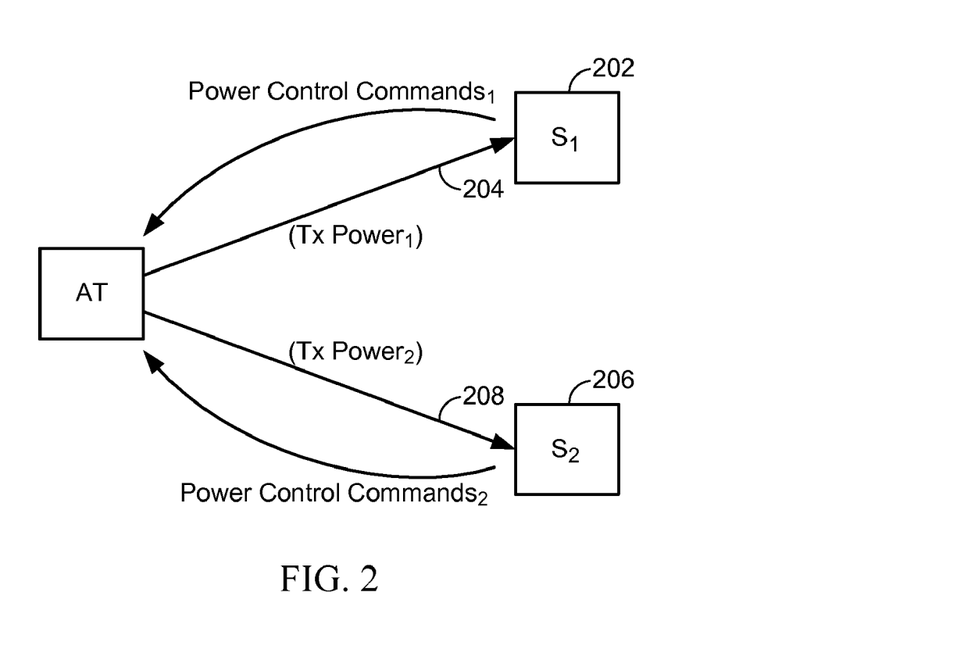
FIG. 2 shows one embodiment for selecting a serving sector for reverse-link handoff.

In one embodiment, an indicia of the transmit power on the power-controlled reverse-link control channels may be monitored to characterize the reverse-link channel condition. According to a first embodiment, the AT follows the "up/down" power control commands from the sectors to independently characterize the corresponding control channels. The power-control commands adjust the RL control channel transmit power such that each control channel achieves the same performance at the targeted sector. The AT selects the RL serving sector based on the transmit power needed on the control channel. For example, consider an AT with an active set of two sectors, as shown in FIG. 2. The power control commands from first sector 202 adjust the transmit power on first control channel 204 sent to first sector 202 to achieve a certain target level of performance, e.g., carrier power over interference power, erasure rate, error rate, etc. Similarly, the power control commands from second sector 206 adjust the transmit power on second control channel 208 sent to second sector 206 to achieve the same target level of performance as achieved at first sector 202. The AT then looks at the transmit powers for first control channel 204 and for second control channel 208 to determine the relative performance of the RL channels. Alternatively, the AT may observe the filtered or averaged transmit power on a control channel over time, or a combination of the instantaneous and average powers. If the transmit power needed for first control channel 204 is less than the transmit power needed for second control channel 208, then first control channel 204 would be a better RL channel. The AT may then indicate its desire to use first sector 202 as a RL serving sector, as discussed later herein.

Figure 3:
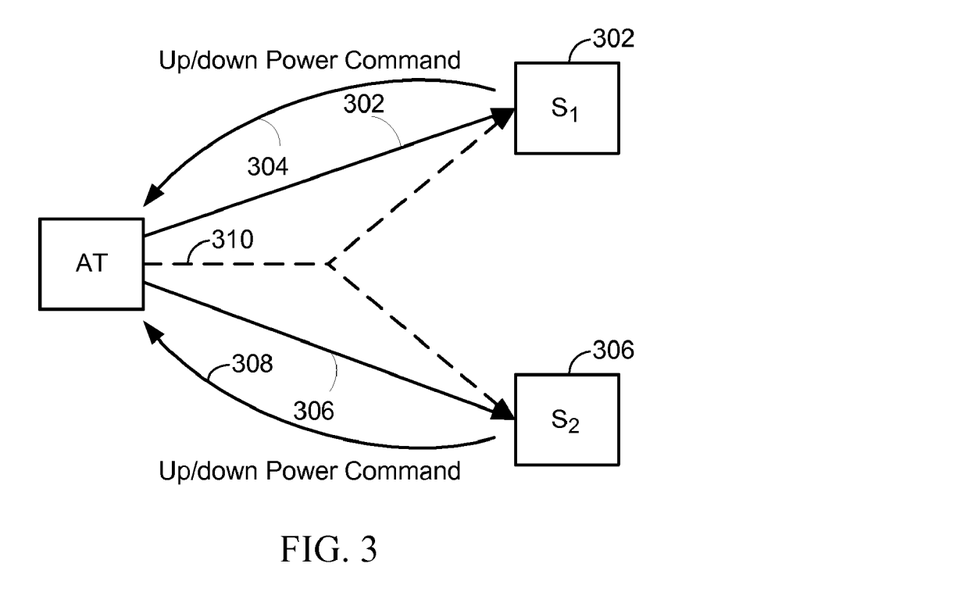
FIG. 3 shows another embodiment for selecting a serving sector for reverse-link handoff.

According to a second embodiment, the AT may use the transmit power on the RL control channels and follow an "or-of-downs" power control policy. The "up" or "down" power control commands adjust the RL control channel transmit power such that a target performance is achieved at the RL serving sector. The AT selects a RL serving sector based on comparing an (filtered) estimate of the rate or percentage of "down" commands from each sector in the active set. The sector with the highest percentage of down commands corresponds to the strongest RL channel. For example, consider the AT with active set size of two, as shown in FIG. 3. According to one embodiment, if either sector sends a "power down" command, on 304 or 308, then the AT reduces the transmit power on both control channels 302, 306 to the same level, and if both sectors send "power up" commands, one 304 and 308, then the AT increases the transmit power on both control channels 302, 306 to the same level. Alternatively, one control channel 310 (shown in broken line) may be sent to some or all sectors, which may be decoded by the respective sectors. If the current (filtered) value of power down commands shows that first sector 302 has sent 50% power down commands while second sector 306 has sent 0% power down commands, or 100% power up commands, then first sector 302 has a stronger RL channel than second sector 306, and the AT indicates its desire to use first sector 302 as the RL serving sector, as discussed later herein.

According to a third embodiment, a combination of the above two embodiments may be used. The current RL control channel is power controlled to an RL serving sector level of performance according to the first embodiment, and the other control channels are power controlled according to the second embodiment. The RL channel quality is characterized by a combination of the (filtered) RL transmit power and the (filtered) percentage of power down commands. The RL with the smallest control channel transmit power corresponds to the desired RL channel, and the percentage of power down commands may be used as a tie breaker between links of equivalent transmit power.

According to a fourth embodiment, in the second embodiment (FIG. 3) some of the power control commands may be used to power control the control channel to meet a desired performance at a specific sector or a subset of sectors, and the filtered values of some of the power control commands may be used to determine a desired RL serving sector.

According to a fifth embodiment, the AT may transmit a signal, such as a pseudo-random noise (PN) sequence, at a specified power level and a specified time, and monitor the feedbacks received from the sectors. Each sector in the active set measures the received power of the signal or PN sequence. The received powers are then pooled in a common area, either at an AP through the backbone network or at the AT through feedback transmissions. The received power levels, or filtered values of the received power levels over time, are compared to find the strongest received power. The strongest received power corresponds to the strongest RL channel. If the information is known at the AT, then the AT indicates the strongest RL as its desired serving sector. If the information is known at the access point, then the AP indicates the serving sector either by sending an explicit message to the AT or by making a RL channel assignment to the AT on the corresponding RL serving sector.

FL Serving-Sector Selection

Figure 4:
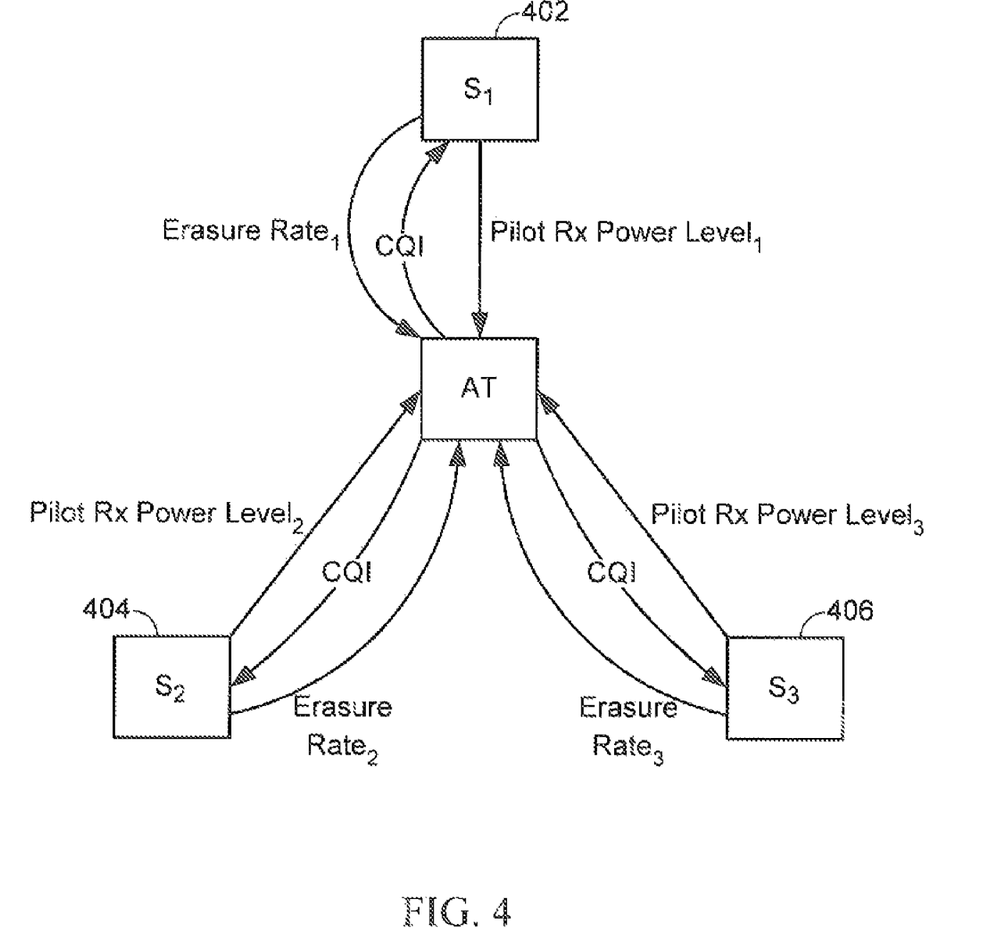
FIG. 4 shows one embodiment for selecting a serving sector for forward-link handoff.

In a first embodiment, a forward-link (FL) serving sector is chosen based on the highest received power levels of similar pilot signals that an access terminal (AT) receives from a plurality of sectors. In a second embodiment, the FL sector is chosen based on the highest received power levels of the pilot signals that an AT receives from a plurality of sectors having acceptable RL control channel performance, e.g., erasure rate. For example, consider an AT with an active set of three sectors, as shown in FIG. 4. Assume the received power levels of the pilot signals that the AT receives are in the descending order of 20 mW from first sector 402, 10 mW from second sector 404, and 5 mW from third sector 406, and the erasure rates indicated by the sectors, or calculated at the AT based on the erasure indicators received on the forward links of the three sectors, are also in the descending order of 100% at first sector 402, 80% at second sector 404, and 50% at third sector 406. For an erasure rate/indicator threshold of 85%, second sector 404 would be selected as a desired FL serving sector.

The above disclosed embodiments provide for independently characterizing the reverse-link and forward-link channel quality, allowing disjoint handoffs, where the reverse-link and forward-link have different serving sectors, which may occur at different times and/or situations.

Indicating the desired RL/FL Serving Sectors

After selecting the desired RL and/or FL serving sectors for RL and/or FL handoffs, respectively, the access terminal (AT) may indicate the desired forward-link and reverse-link serving sectors for FL and/or RL handoffs. In one embodiment, the AT may use the dedicated reverse-link control channels to indicate the desired serving sectors for RL and/or FL handoff. An AT may have at least a pair of dedicated RL control channels sent on the RL to each sector in the AT's active set, where the AT's active set may include all sectors that the AT may consider for both FL and RL handoff. For example, if the AT has an active set size of two, then it has a pair of control channels to sector 1 and another pair of control channels to sector 2. According to one embodiment, the first dedicated RL control channel may be the channel quality indicator (CQI) channel, which indicates the forward-link (FL) channel quality, and the second dedicated RL control channel may be the REQ channel, which indicates a request for a RL data channel assignment. Alternatively, other RL control channel signals indicating information such as channel quality, data request, access request, state transition request, keep alive, acknowledgements, data packet headers, etc, may be used. During handoff, when the active set size is greater than one, these control channels may indicate the AT's desired serving sector for FL and/or RL handoff. In one embodiment, the CQI channel is used by the AT to indicate a desired serving sector change for FL traffic, and the REQ channel is used by the AT to indicate a desired serving sector change for the RL traffic, as disclosed below. In one embodiment, both RL control channels may be sent in one transmission. In one embodiment, an AT may use one RL control channel and an FL/RL indicator to identify the desired FL/RL serving sector. For example, a two-bit indicator may be used, where one bit indicates the desired FL serving sector and the other indicates the desired RL serving sector.

Figure 5:
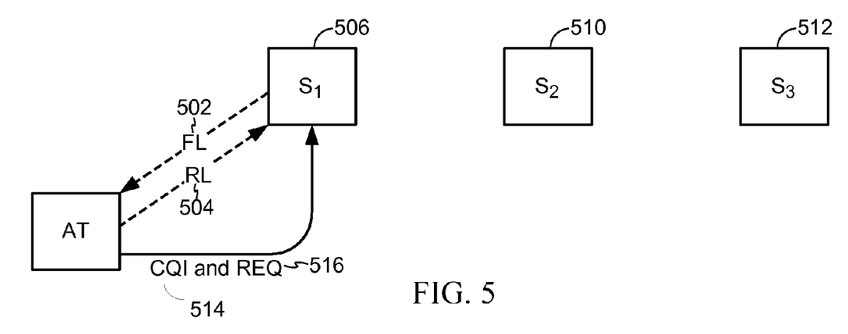
FIG. 5 shows one embodiment for indicating a selected serving sector for forward-link and reverse-link handoffs.
Figure 6:
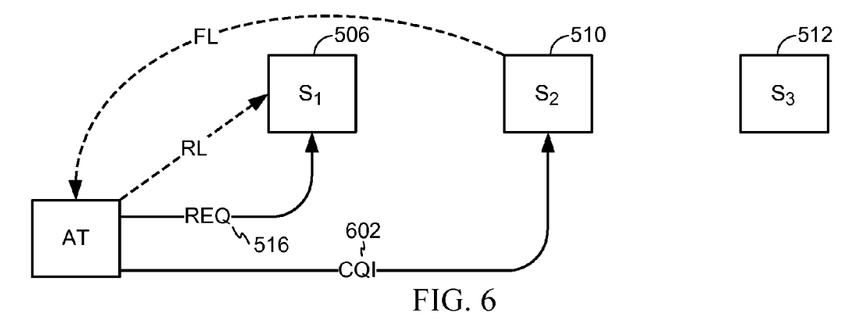
FIGS. 6 and 7 show embodiments for indicating selected serving sectors for forward-link and reverse-link handoffs.
Figure 7:
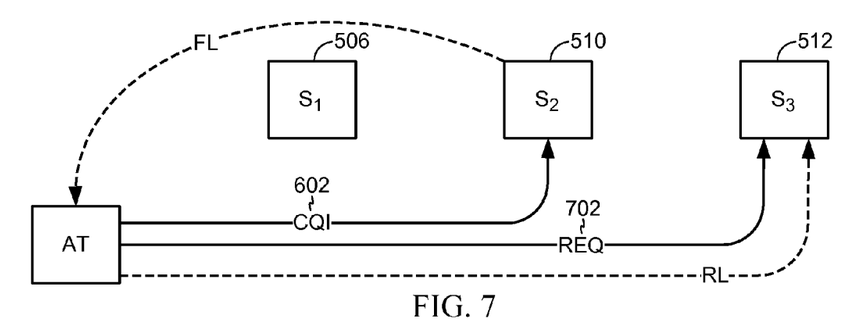

According to a first embodiment of indicating the desired serving sector, a specific control channel is sent to the desired serving sector, and the specific control channels on other sectors are erased. For example, consider an AT with an active set size of three, as shown in FIG. 5. Initially, the AT's FL 502 and RL 504 traffic are being served by first sector 506. During this time, the AT sends a first signal 514, e.g., CQI, and a second signal 516, e.g., REQ, to first sector 506, and erases such transmissions to second sectors 510 and third sector 512. Later, based on the AT's handoff algorithm, the AT decides to switch the FL serving sector to second sector 510, but keep the RL serving sector at first sector 506. The AT stops sending CQI to first sector 506 and starts sending CQI 602 to second sector 510, indicting the desired FL serving sector, while during this time the AT continues sending REQ 516 to first sector 506, as shown in FIG. 6. Later, the AT desires to switch the RL serving sector from first sector 506 to third sector 512, this is indicated by stopping transmission of REQ to first sector 506 and starting transmission of REQ 702 to third sector 512, as shown in FIG. 7.

Figure 8:
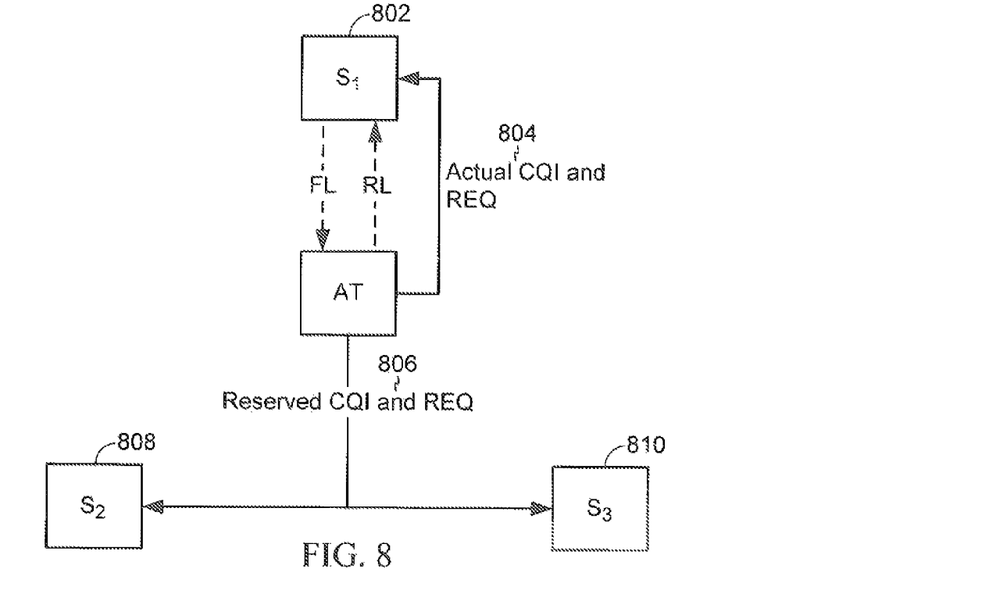
FIG. 8 shows one embodiment for indicating a selected serving sector for forward-link and reverse-link handoffs.
Figure 9:
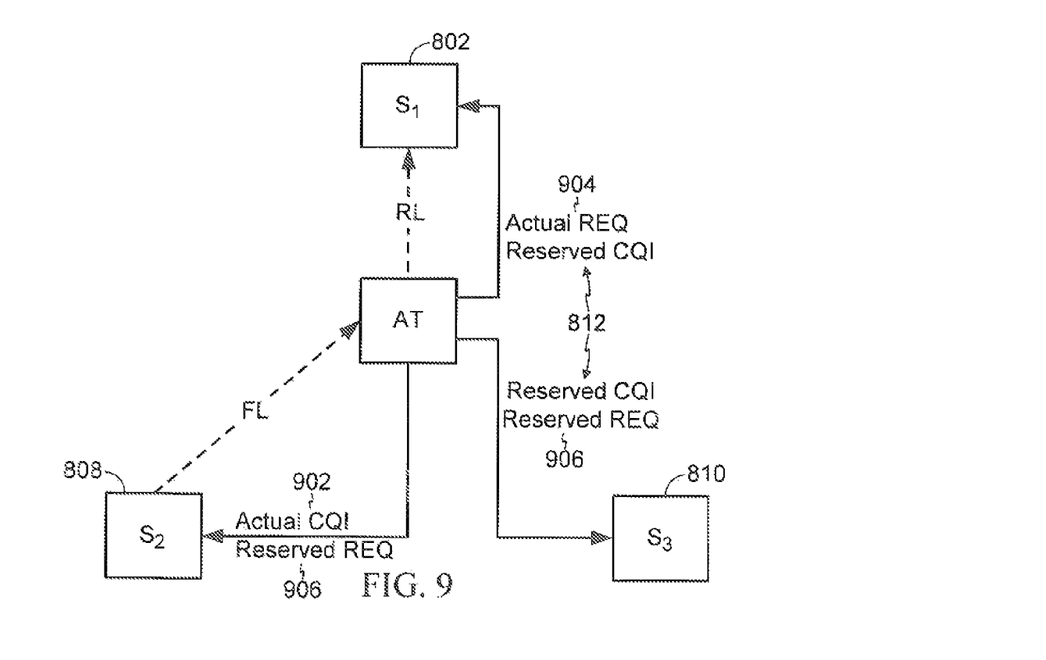
FIG. 9 shows one embodiment for indicating selected serving sectors for forward-link and reverse-link handoffs.

According to a second embodiment of indicating the desired serving sector, According to a second embodiment of indicating the desired serving sector, a specific value for each control channel is reserved and communicated to the target serving sector. The value may be reserved when the AT has an active set size greater than one. If the value is reserved when the AT has an active set size greater than one, and later the AT's active set size changes to one, the reserved value may be used for a different purpose, e.g., as another CQI or REQ value. According to one embodiment, some control channels, e.g., CQI and/or REQ, of four bits may be used, while their first 15 values (0000 through 1110) may be used for actual values and their last value (1111) may be used as the reserved value. Other sizes may be used for the control channels, e.g., CQI and REQ, and the reserved value. For example, consider an AT that has an active set size of three and is initially served by first sector 802 in FIG. 8. During this time, the AT sends the actual CQI and REQ values 804 (e.g., some or different values from 0000 through 1110, based on desired level of granularity) to first sector 802, while sending the reserved CQI and REQ values 806 (e.g., 1111) to second sectors 808 and third sector 810, as shown in FIG. 8. When the AT decides to switch the FL serving sector to second sector 808, the AT indicates this choice by sending the actual CQI value 902 (e.g., a value from 0000 through 1110) to second sector 808, and sending the reserved CQI value 812 (e.g., 1111) to first sectors 802 and third sector 810. During the FL handoff, the AT continues sending the actual REQ value 904 to first sector 802 and reserved REQ values 906 to the second and third sectors to indicate that the AT wants to continue sending RL transmissions to first sector 802, as shown in FIG. 9.

Figure 10:
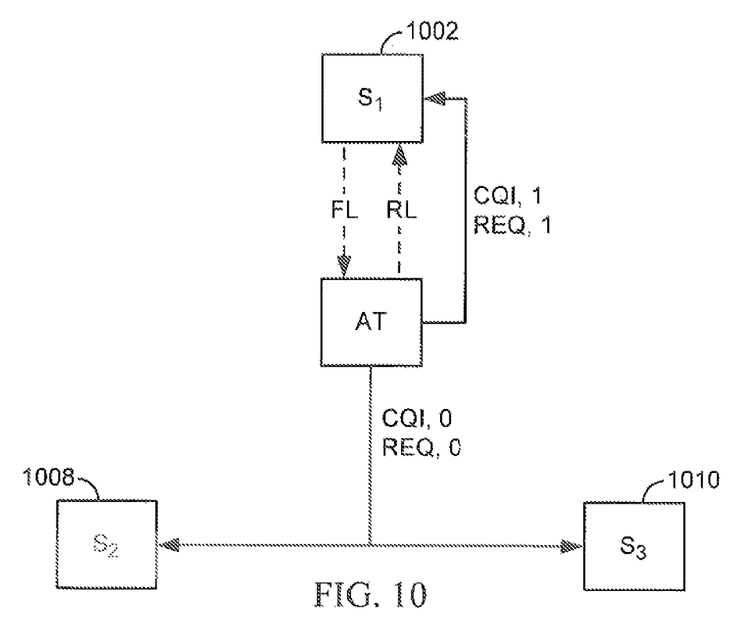
FIG. 10 shows one embodiment for indicating a selected serving sector for forward-link and reverse-link handoffs.
Figure 11:
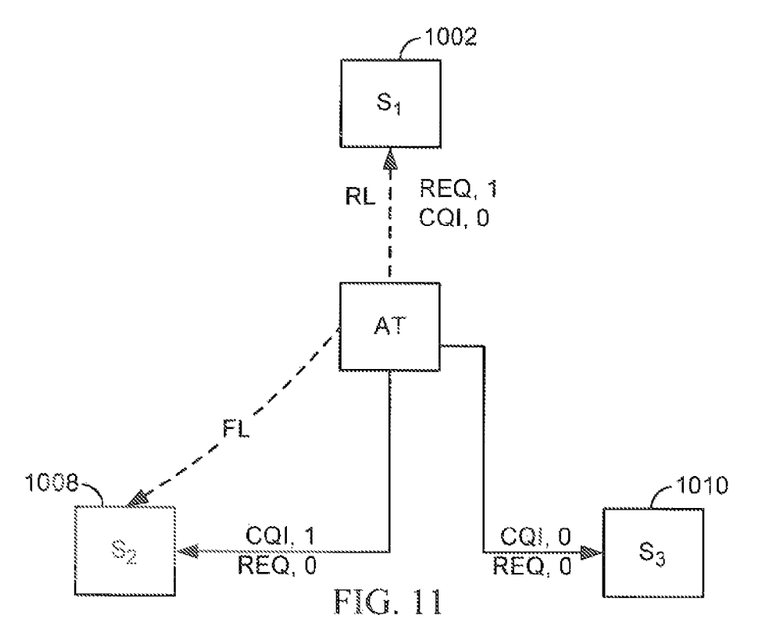
FIG. 11 shows one embodiment for indicating selected serving sectors for forward-link and reverse-link handoffs.

According to a third embodiment of indicating the desired serving sector, a separate number of bits are reserved for each control channel. These bits may be reserved when the AT's active set size is greater than one, allowing for more values for CQI and REQ when the AT's active set size is one. According to one embodiment, a 3-bit control channel, e.g., CQI and/or REQ, may be used, while a separate 1-bit value may be used as a reserved value. Other sizes may be used for control channels, e.g., CQI and REQ, and the reserved value. Consider the example where the AT has an active set size of three and is initially served by first sector 1002, as shown in FIG. 10. During this time, the AT sends the CQI and REQ values (e.g., same or different values from 000 through 111, based on desired level of granularity) along with the reserved values of "1" to first sector 1002, while sending the CQI and REQ values (e.g., values from 0000 through 111) along with reserved values "0" to second sectors 1008 and third sector 1010, as shown in FIG. 10. When the AT decides to switch the FL serving sector to sector 1008, the AT indicates this choice by sending the CQI value (e.g., from 000 through 111) along with the reserved value "1" to second sector 1008, and sending the CQI value (e.g., from 000 through 111) along with reserved value "0" to first sector 1002 and third sector 1010. During the FL handoff, the AT continues sending the REQ value (e.g., from 000 through 111) along with reserved value "1" to first sector 1002 and REQ values (e.g., same or different values from 000 through 111) along with reserved value "0" to second sector 1008 and third sector 1010 to indicate that the AT wants to continue receiving RL transmissions from first sector 1002, as shown in FIG. 11.

Figure 12:
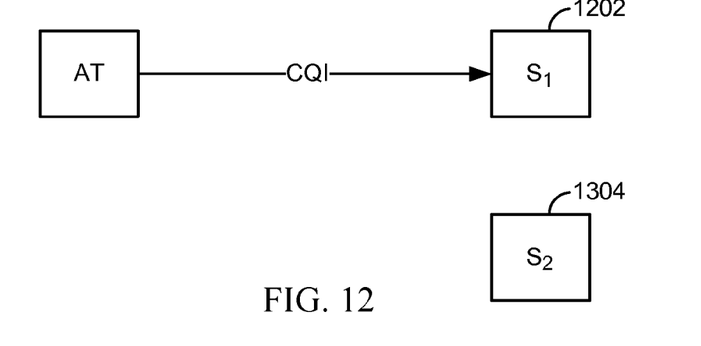
FIGS. 12-14 show embodiments for indicating selected serving sectors for forward-link and reverse-link handoffs.
Figure 13:
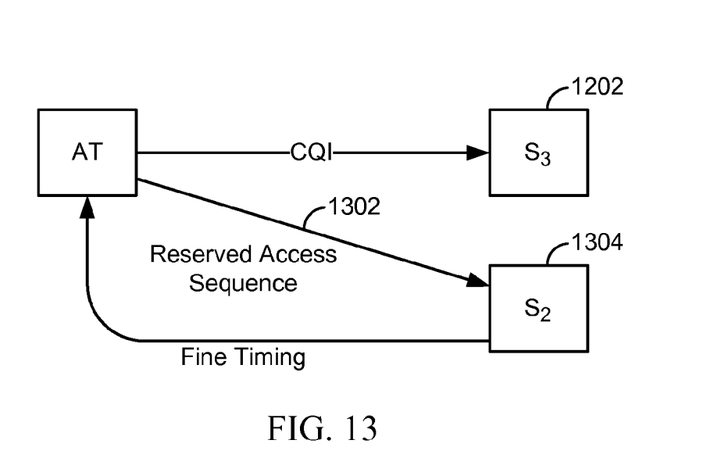
Figure 14:
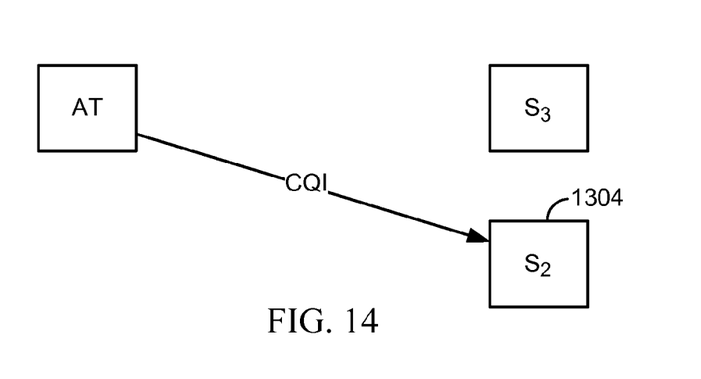

According to a fourth embodiment, the AT indicates a desired FL/RL serving sector for a FL/RL handoff by sending a specific reserved access sequence to the desired sector. The desired serving sector may belong to an asynchronous group of sectors, i.e., a group of sectors in the active set that may not have been time synchronized with other sectors in the active set. In one embodiment, the target sector may provide fine timing synchronization information to the AT after receiving the reserved access sequence. Consequently, during an asynchronous handoff, a full-blown access procedure may not be needed, because the target serving sector holds some information, e.g., MAC-ID, about the AT, e.g., as a result of having received the reserved access sequence and/or fine timing synchronization. For example, the AT may be currently in FL communication with a first sector 1202, as shown in FIG. 12. Before handing off to a second serving sector, the AT sends the reserved access sequence 1302 to the second sector 1304 to indicate it as a desired serving sector, as shown in FIG. 13, and then the AT hands off to the target serving sector 1404, as shown in FIG. 14. In the case of asynchronous handoff, the AT hands off to the target serving sector 1404, as shown in FIG. 14, after achieving (fine timing) synchronization with the target sector 1304. According to a fifth embodiment, a combination of the above four embodiments may be used to indicate a desired serving sector. For example, the FL serving sector selection may use embodiment three with a reserved bit, while the RL serving sector selection may use embodiment one erasing all but the desired serving sector control channels.

Therefore, reverse-link control channels may be used by the access terminal to indicate the desired serving sector for the forward-link and/or reverse-link handoffs. This scheme allows for fast handoff between serving sectors without requiring expensive (in terms of air resources and time) higher layer signaling.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Figure 15:
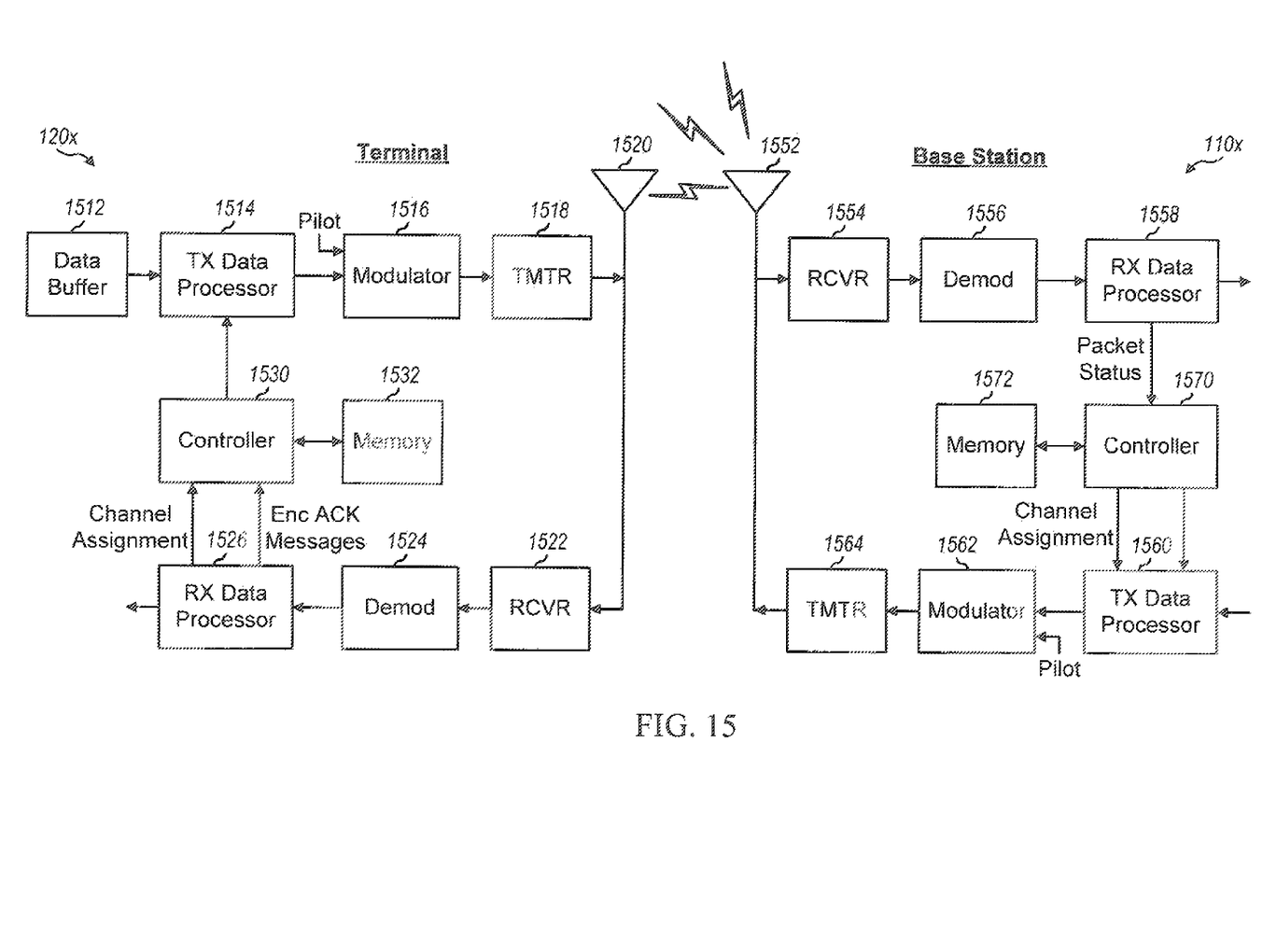
FIG. 15 shows a block diagram of an access point and an access terminal.

FIG. 15 shows a block diagram of an access point 110*x* and an access terminal 120*x*, which are one of the access points and one of the terminals, respectively, in FIG. 1. For the reverse link, at terminal 120*x*, a transmit (TX) data processor 1514 receives traffic data from a data buffer 1512, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 1516 receives the data symbols, pilot symbols, and possibly signaling for the reverse link, performs OFDM modulation and/or other processing as specified by the system, and provides a stream of output chips. A transmitter unit (TMTR) 1518 processes (e.g., converts to analog, filters, amplifies, and frequency upconverts) the output chip stream and generates a modulated signal, which is transmitted from an antenna 1520.

At access point 110*x*, the modulated signals transmitted by terminal 120*x* and other terminals in communication with access point 110*x* are received by an antenna 1552. A receiver unit (RCVR) 1554 processes (e.g., conditions and digitizes) the received signal from antenna 1552 and provides received samples. A demodulator (Demod) 1556 processes (e.g., demodulates and detects) the received samples and provides detected data symbols, which are noisy estimate of the data symbols transmitted by the terminals to access point 110*x*. A receive (RX) data processor 1558 processes (e.g., symbol demaps, deinterleaves, and decodes) the detected data symbols for each terminal and provides decoded data for that terminal.

For the forward link, at access point 110*x*, traffic data is processed by a TX data processor 1560 to generate data symbols. A modulator 1562 receives the data symbols, pilot symbols, and signaling for the forward link, performs OFDM modulation and/or other pertinent processing, and provides an output chip stream, which is further conditioned by a transmitter unit 1064 and transmitted from antenna 1552. The forward-link signaling may include power control commands, timing synchronization information, etc. generated by a controller 1570 for all terminals transmitting on the reverse link to access point 110*x*. At terminal 120*x*, the modulated signal transmitted by access point 110*x* is received by antenna 1520, conditioned and digitized by a receiver unit 1522, and processed by a demodulator 1524 to obtain detected data symbols. An RX data processor 1526 processes the detected data symbols and provides decoded data for the terminal and the forward-link signaling. Controller 1530 receives the power control commands and controls data transmission and transmit power on the reverse link to access point 110*x*. Controllers 1530 and 1570 direct the operation of terminal 120*x* and access point 110*x*, respectively. Memory units 1532 and 1572 store program codes and data used by controllers 1530 and 1570, respectively.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 1532 or 1572 in FIG. 15) and executed by a processor (e.g., controller 1530 or 1570). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of handoff in a wireless communication system, comprising:
    establishing a plurality of forward links between a plurality of forward link sectors and a mobile device;
    establishing a plurality of reverse links between the mobile device and a plurality of reverse link sectors;
    selecting at the mobile device a serving reverse link sector from the plurality of reverse link sectors for handoff based on the signal quality of the reverse link, wherein the signal quality comprises a transmit power level; and
    selecting at the mobile device a serving forward link sector from the plurality of forward link sectors for handoff based on the signal quality of the forward link, wherein the signal quality comprises a received power level of a pilot signal;
    wherein the selecting of the serving reverse link sector is independent of the selecting of the serving forward link sector; and
    wherein the serving forward link sector and the serving reverse link sector are different sectors and are selected at the same time.

2. The method as in claim 1 further including the number of power down commands received for maintaining the power level of the reverse link as the signal quality of the reverse link.

3. The method as in claim 1, further including receiving feedback from each of the plurality of reverse link sectors for the signal quality of the reverse link.

4. The method as in claim 1, further including establishing a serving forward link with the selected forward link sector and establishing a serving reverse link with the selected reverse link sector.

5. The method as in claim 1, further including sending a reserved access sequence to one of the plurality of reverse link sectors prior to handoff.

6. An apparatus in a wireless communication system, comprising:
   means for establishing a plurality of forward links between a plurality of forward link sectors and a mobile device;
   means for establishing a plurality of reverse links between the mobile device and a plurality of reverse link sectors;
   means for selecting at the mobile device a serving reverse link sector from the plurality of reverse link sectors for handoff based on the signal quality of the reverse link, wherein the signal quality comprises a transmit power level; and
   means for selecting at the mobile device a serving forward link sector from the plurality of forward link sectors for handoff based on the signal quality of the forward link, wherein the signal quality comprises a received power level of a pilot signal;
   wherein the serving reverse link sector and the serving forward link sector are selected independently; and
   wherein the serving forward link sector and the serving reverse link sector are different sectors and are selected at the same time.

7. The apparatus as in claim 6 further including the number of power down commands received for maintaining the power level of the reverse link as the signal quality of the reverse link.

8. The apparatus as in claim 6, further comprising means for receiving feedback from each of the plurality of reverse link sectors for the signal quality of the reverse link.

9. The apparatus as in claim 6, further comprising means for establishing a serving forward link with the selected forward link sector and means for establishing a serving reverse link with the selected reverse link sector.

10. The apparatus as in claim 6, further comprising means for sending a reserved access sequence to one of the plurality of reverse link sectors prior to handoff.

11. An apparatus in a wireless communication system, comprising:
    a memory; and
    a processor coupled to the memory, the processor being configured to:
      establish a plurality of forward links between a plurality of forward link sectors and a mobile device and a plurality of reverse links between the mobile device and a plurality of reverse link sectors; and
      select at the mobile device a serving reverse link sector from the plurality of reverse link sectors for handoff based on the signal quality of the reverse link, wherein the signal quality comprises, a transmit power level; and
      select at the mobile device a serving forward link sector from the plurality of forward link sectors for handoff based on the signal quality of the forward link, wherein the signal quality comprises a received power level of a pilot signal;
    wherein the processor is configured to select the serving reverse link sector independent of the serving forward link sector; and
    wherein the serving forward link sector and the serving reverse link sector are different sectors and are selected at the same time.

12. The apparatus as in claim 11 further including the number of power down commands received for maintaining the power level of the reverse link as the signal quality of the reverse link.

13. The apparatus as in claim 11 being further configured to receive feedback from each of the plurality of sectors for the signal quality of the reverse link.

14. The apparatus as in claim 11 being further configured to establish a serving forward link with the selected forward link sector and establish a serving reverse link with the selected reverse link sector.

15. The apparatus as in claim 11 being further configured to send a reserved access sequence to one of the plurality of reverse link sectors prior to handoff.

16. A computer-readable medium stored in a memory unit, comprising:
    at least one set of codes for establishing a plurality of forward links between a plurality of forward link sectors and a mobile device;
    at least one set of codes for establishing a plurality of reverse links between the mobile device and a plurality of reverse link sectors;
    at least one set of codes for selecting at the mobile device a serving reverse link sector from the plurality of reverse link sectors for handoff based on the signal quality of the reverse link, wherein the signal quality comprises a transmit power level; and
    at least one set of codes for selecting at the mobile device a serving forward link sector from the plurality of forward link sectors for handoff based on the signal quality of the forward link, wherein the signal quality comprises a received power level of a pilot signal,
    wherein the serving reverse link sector and the serving forward link sector are selected independently; and
    wherein the serving forward link sector and the serving reverse link sector are different sectors and are selected at the same time.

17. The method of claim 1, wherein the selecting of the serving forward link sector further comprises selecting from the plurality of forward link sectors having a control channel performance level meeting a predetermined threshold.

18. The method of claim 1, wherein the selecting of the serving reverse link sector further comprises selecting the one of the plurality of reverse link sectors having a lowest amount of reverse link transmit power and a highest rate of transmit power "down" commands.

19. The method of claim 1, further comprising independently performing the handoff to at least one of the selected serving reverse link sector or the selected serving forward link sector.

20. The apparatus as in claim 11 being further configured to select the serving forward link sector from the plurality of forward link sectors having a control channel performance level meeting a predetermined threshold.

21. The apparatus as in claim 11 being further configured to select as the serving reverse link sector the one of the plurality of reverse link sectors having a lowest amount of reverse link transmit power and a highest rate of transmit power "down" commands.

22. The apparatus as in, claim 11 being further configured to independently perform the handoff to at least one of the selected serving reverse link sector or the selected serving, forward link sector.

23. At least one processor, comprising:
- a first processor unit operable for establishing a plurality of forward links between a plurality of forward link sectors and a mobile device;
- a second processor unit operable for establishing a plurality of reverse links between the mobile device and a plurality of reverse link sectors;
- a third processor unit operable for selecting at the mobile device a serving reverse link sector from the plurality of reverse link sectors for handoff based on the signal quality of the reverse link, wherein the signal quality comprises a transmit power level; and
- a fourth processor unit operable for selecting at the mobile device a serving forward link sector from the plurality of forward link sectors for handoff based on the signal quality of the forward link, wherein the signal quality comprises a received power level of a pilot signal;
- wherein the selecting of the serving reverse link sector is independent of the selecting of the serving forward link sector; and
- wherein the serving forward link sector and the serving reverse link sector are different sectors and are selected at the same time.

* * * * *